United States Patent [19]

Trimble et al.

[11] Patent Number: 5,499,697
[45] Date of Patent: Mar. 19, 1996

[54] SHOPPING CART AUTOMATIC DUAL BRAKE

[76] Inventors: Willard R. Trimble; Robin D. Trimble; Emerson Trimble, all of 114 Greenway Dr., Bloomingdale, Ill. 60108

[21] Appl. No.: 306,405

[22] Filed: Sep. 15, 1994

[51] Int. Cl.⁶ .................................................. B62B 5/04
[52] U.S. Cl. .................................................. 188/19; 188/29
[58] Field of Search .................. 188/19, 21, 22, 188/29, 2 D; 280/33.994

[56]  References Cited

U.S. PATENT DOCUMENTS

| | | | |
|---|---|---|---|
| 3,095,211 | 6/1963 | Altherr | 188/21 X |
| 3,117,653 | 1/1964 | Altherr | 188/20 X |
| 3,276,550 | 10/1966 | Honeyman | 188/19 X |
| 4,768,622 | 9/1988 | Nicklasson et al. | 188/29 X |
| 5,288,089 | 2/1994 | Bowers et al. | 188/19 X |
| 5,325,938 | 7/1994 | King | 188/19 |

*Primary Examiner*—Robert J. Oberleitner
*Assistant Examiner*—Peter M. Poon

[57]  ABSTRACT

A new and improved shopping cart automatic dual brake with an inverted U-shaped frame secured to the shopping cart below its handle by a guide block. A pair of swivels are secured to the U-shaped frame. A pair of brake components each of which having an upper plate. The upper plate is secured to the pair of swivels. A lower plate aligns with the upper plate. An aperture is formed through the upper plate and the lower plate. A brake shaft is disposed within the aperture and extends outward of the upper plate. An acorn nut is secured to one end of the brake shaft. A brake shoe is secured to another end of the brake shaft. The brake shoe is positioned above the wheels of the shopping cart. A spring with a spring guide is secured to around the brake shaft. The spring serves to force the brake shoe onto the wheel.

4 Claims, 5 Drawing Sheets

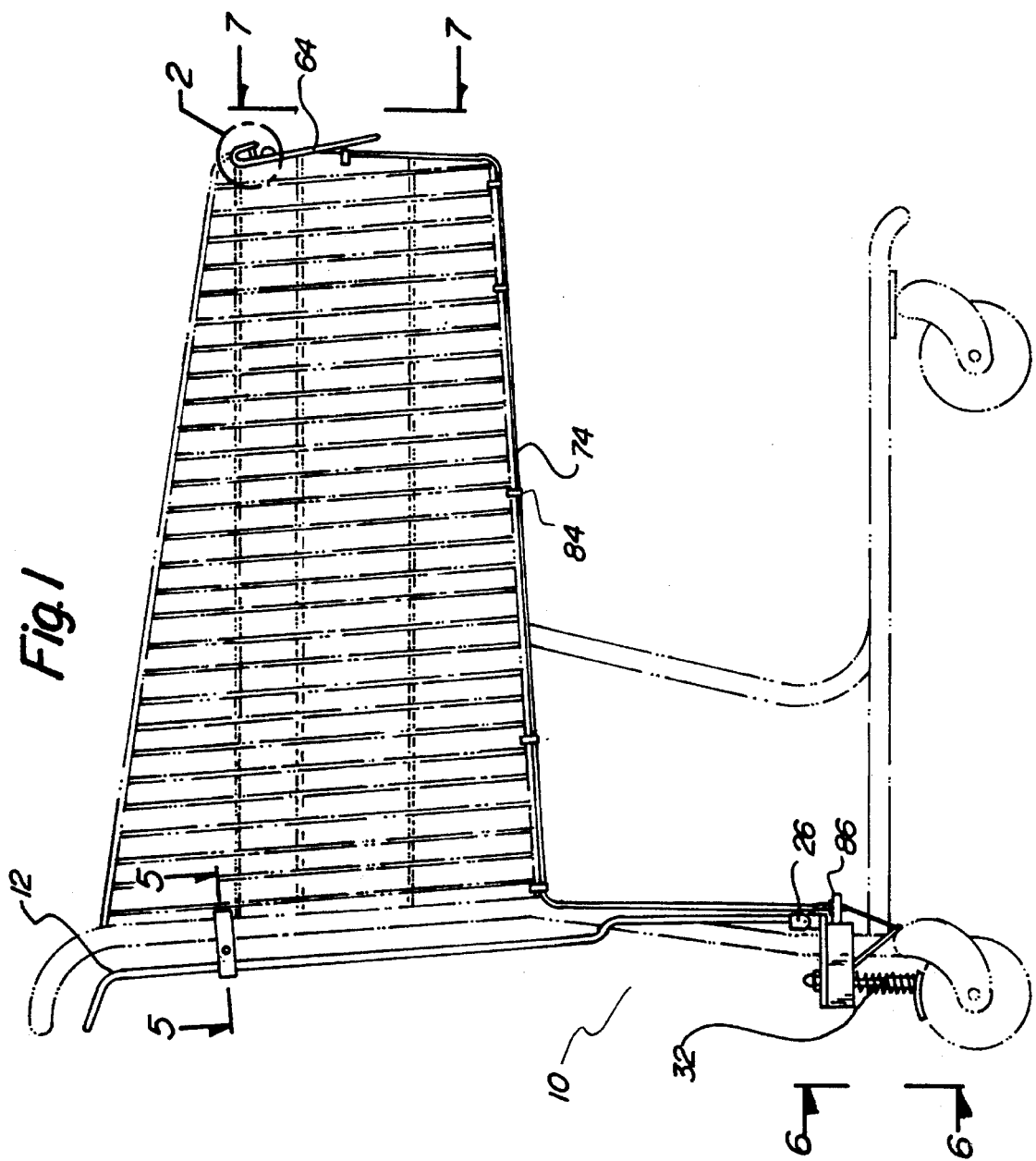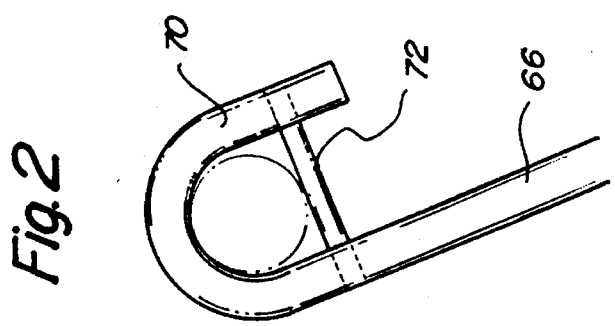

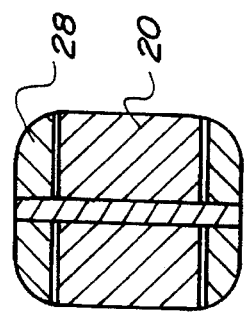
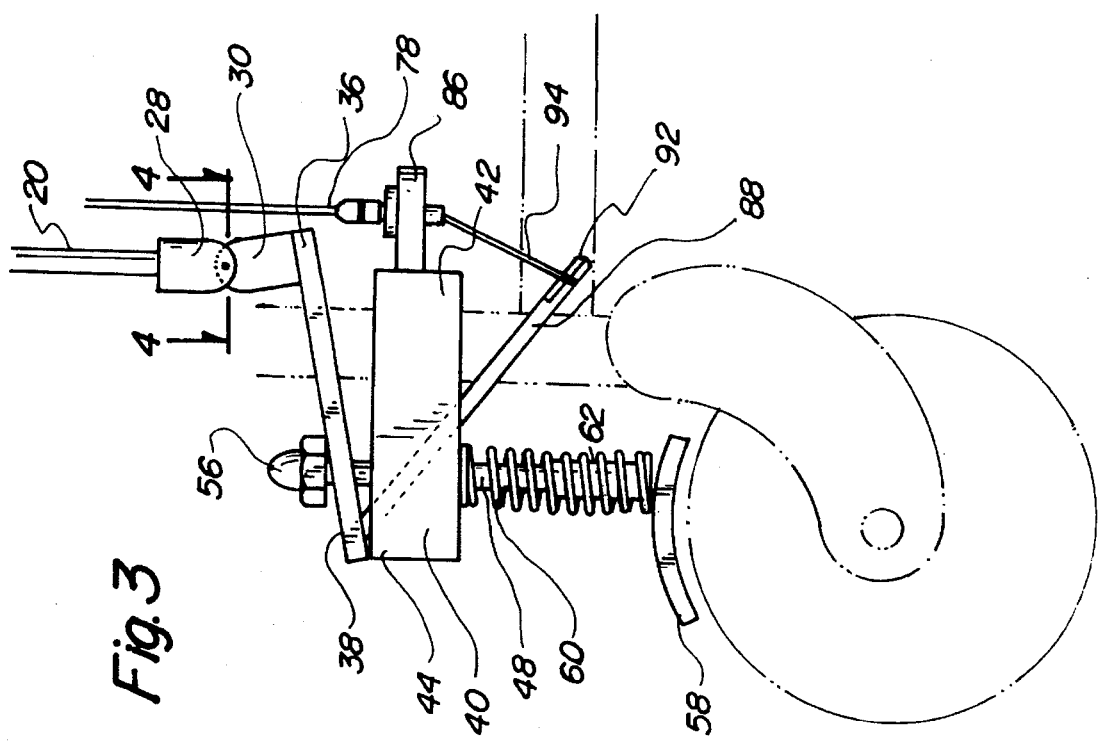

SHOPPING CART AUTOMATIC DUAL BRAKE

BACKGROUND OF THE INVENTION

1. Field of the Invention

The present invention relates to a shopping cart automatic dual brake and more particularly pertains to automatically applying brakes to wheels of the shopping cart with a shopping cart automatic dual brake.

2. Description of the Prior Art

The use of shopping cart brakes is known in the prior art. More specifically, shopping cart brakes heretofore devised and utilized for the purpose of manually applying a brake to a shopping cart are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,652,103 to Higgs discloses an automatic brake for a shopping cart.

U.S. Pat. No. 5,042,622 to Smith et al. discloses a shopping cart foot brake assembly.

U.S. Pat. No. Des. 338,307 to Shaffer et al. discloses the ornamental design for a shopping cart brake.

U.S. Pat. No. 3,458,015 to Collins et al. discloses a shopping cart brake system.

U.S. Pat. No. 5,199,534 to Goff discloses a shopping cart brake.

While these devices fulfill their respective, particular objective and requirements, the aforementioned patents do not describe a shopping cart automatic dual brake for automatically applying brakes to wheels of the shopping cart.

In this respect, the shopping cart automatic dual brake according to the present invention substantially departs from the conventional concepts and designs of the prior art, and in doing so provides an apparatus primarily developed for the purpose of automatically applying brakes to wheels of the shopping cart.

Therefore, it can be appreciated that there exists a continuing need for new and improved shopping cart automatic dual brake which can be used for automatically applying brakes to wheels of the shopping cart. In this regard, the present invention substantially fulfills this need.

SUMMARY OF THE INVENTION

In the view of the foregoing disadvantages inherent in the known types of shopping cart brakes now present in the prior art, the present invention provides an improved shopping cart automatic dual brake. As such, the general purpose of the present invention, which will be described subsequently in greater detail, is to provide a new and improved shopping cart automatic dual brake and method which has all the advantages of the prior art and none of the disadvantages.

To attain this, the present invention essentially comprises an inverted U-shaped frame having two arm portions and a handle portion. The two arm portions each have a first end and a second end. The handle portion has two end portions. Each first end of the two arm portions is integral with the two end portions of the handle portion. The U-shaped frame is secured to the shopping cart below its handle by a guide block. The device contains a pair of swivels each having an upper end and a lower end pivotally secured theretogether. The upper end is secured to each second end of the two arm portions of the U-shaped frame. The device contains a pair of brake components comprised of a right brake component and a left brake component. The pair of brake components have an upper plate extending from the right brake component along a bottom portion of the shopping cart to the left brake component. Each of the pair of brake components have a first portion of the upper plate and a second portion of the upper plate. The first portion is secured to the lower end of each of the pair of swivels. A lower plate has a first end and a second end. The lower plate aligns with the upper plate with the second end secured to the second portion of the upper plate. An aperture is formed through the upper plate and the lower plate. A brake shaft is disposed within the aperture. The brake shaft has a first end, a second end, and an intermediate extent therebetween. The first end extends outwardly of the upper plate. An acorn nut is secured to the first end. A brake shoe is secured to the second end of the brake shaft. The brake shoe is positioned above the rear wheels of the shopping cart. A spring with a spring guide is secured to the intermediate extent of the brake shaft. The spring serves to force the brake shoe onto the wheel. The device contains a front brake release bar having two arm bars and a handle bar. The two arm bars have curved end portions for hanging on a front end of the shopping cart. A securement pin is situated through the curved end portions to secure the two arm bars to the front end. The device contains a front brake cable having a first end, a second end, and an intermediate extent therebetween. The first end is secured to one of the two arm bars of the front brake release handle by a securement means. The intermediate extent extends downwardly of the front end and along an underside of the shopping cart and secured thereto by a plurality of clamps. The device contains a front brake component secured to the second end of the front brake cable. The front brake component has a front release bar. The front release bar has a first end and a second end. The first end is secured to the upper plate adjacent the right brake component. The second end has a wire thereattached for securement to the second end of the front brake component. The device contains a pair of foot bars secured to the upper plate inward of the right brake component and the left brake component.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved shopping cart automatic dual brake which has all the advantages of the prior art shopping cart brakes and none of the disadvantages.

It is another-object of the present invention to provide a new and improved shopping cart automatic dual brake which may be easily and efficiently manufactured and marketed.

It is a further object of the present invention to provide a new and improved shopping cart automatic dual brake which is of durable and reliable construction.

An even further object of the present invention is to provide a new and improved shopping cart automatic dual brake which is susceptible of a low cost of manufacture with regard to both materials and labor, and which accordingly is then susceptible of low prices of sale to the consuming public, thereby making such a shopping cart automatic dual brake economically available to the buying public.

Still yet another object of the present invention is to provide a new and improved shopping cart automatic dual brake which provides in the apparatuses and methods of the prior art some of the advantages thereof, while simultaneously overcoming some of the disadvantages normally associated therewith.

Even still another object of the present invention is to provide a new and improved shopping cart automatic dual brake for automatically applying brakes to wheels of the shopping cart.

Lastly, it is an object of the present invention to provide a new and improved shopping cart automatic dual brake with an inverted U-shaped frame secured to the shopping cart below its handle by a guide block. A pair of swivels are secured to the U-shaped frame. A pair of brake components each of which having an upper plate. The upper plate is secured to the pair of swivels. A lower plate aligns with the upper plate. An aperture is formed through the upper plate and the lower plate. A brake shaft is disposed within the aperture and extends outward of the upper plate. An acorn nut is secured to one end of the brake shaft. A brake shoe is secured to another end of the brake shaft. The brake shoe is positioned above the wheels of the shopping cart. A spring with a spring guide is secured to around the brake shaft. The spring serves to force the brake shoe onto the wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of the preferred embodiment of the shopping cart automatic dual brake constructed in accordance with the principles of the present invention.

FIG. 2 is an enlarged view of the upper end of the front release handle taken from FIG. 1.

FIG. 3 is an enlarged side view of the brake of the present invention.

FIG. 4 is a cross-sectional view taken along line 4—4 of FIG. 3.

The same reference numerals refer to the same parts through the various Figures.

DESCRIPTION OF THE PREFERRED EMBODIMENT

Figure 5:
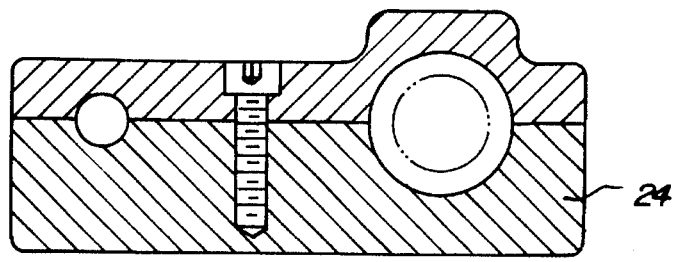
FIG. 5 is a cross-sectional view of the guide block taken along line 5—5 of FIG. 1.
Figure 6:
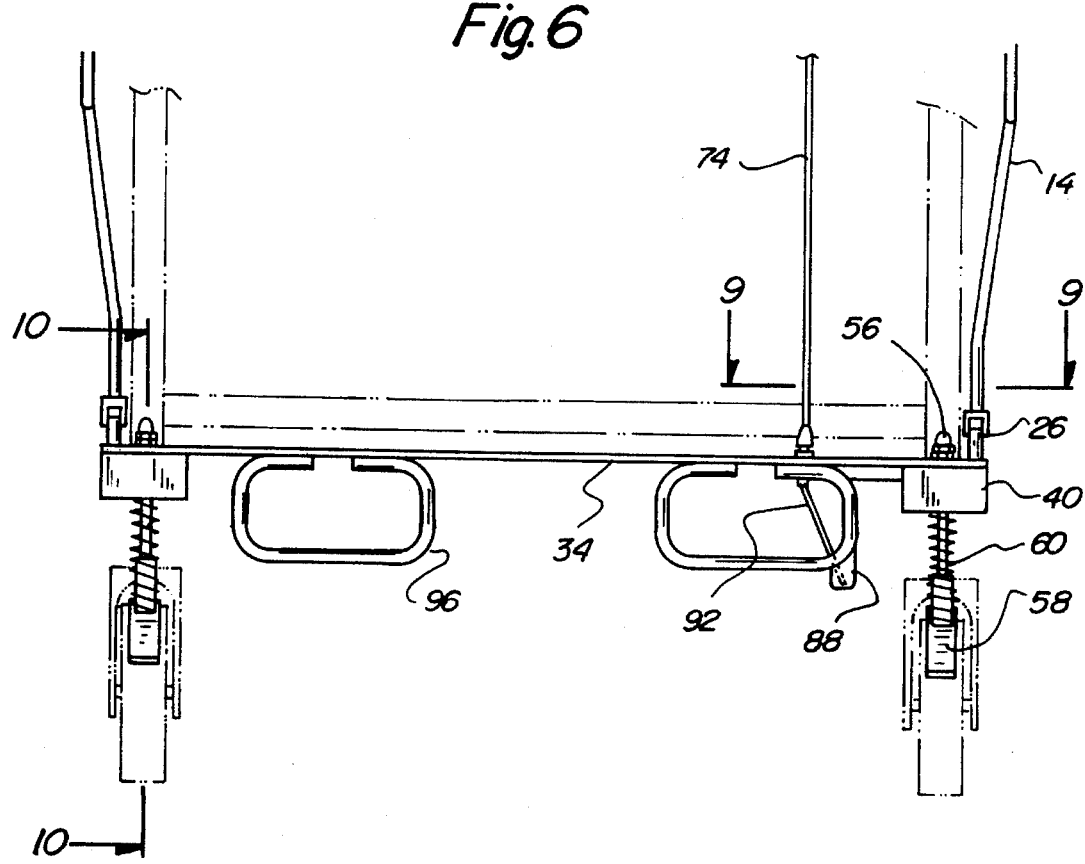
FIG. 6 is a sectional view of the rear wheels of the shopping cart as seen along line 6—6 of FIG. 1.
Figure 7:
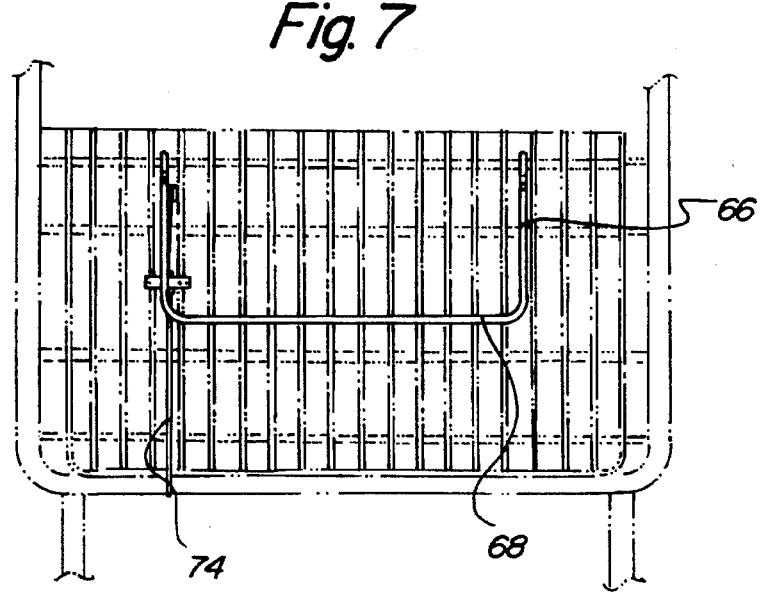
FIG. 7 is a sectional view of the front of the shopping cart as seen along line 7—7 of FIG. 1.
Figure 8:
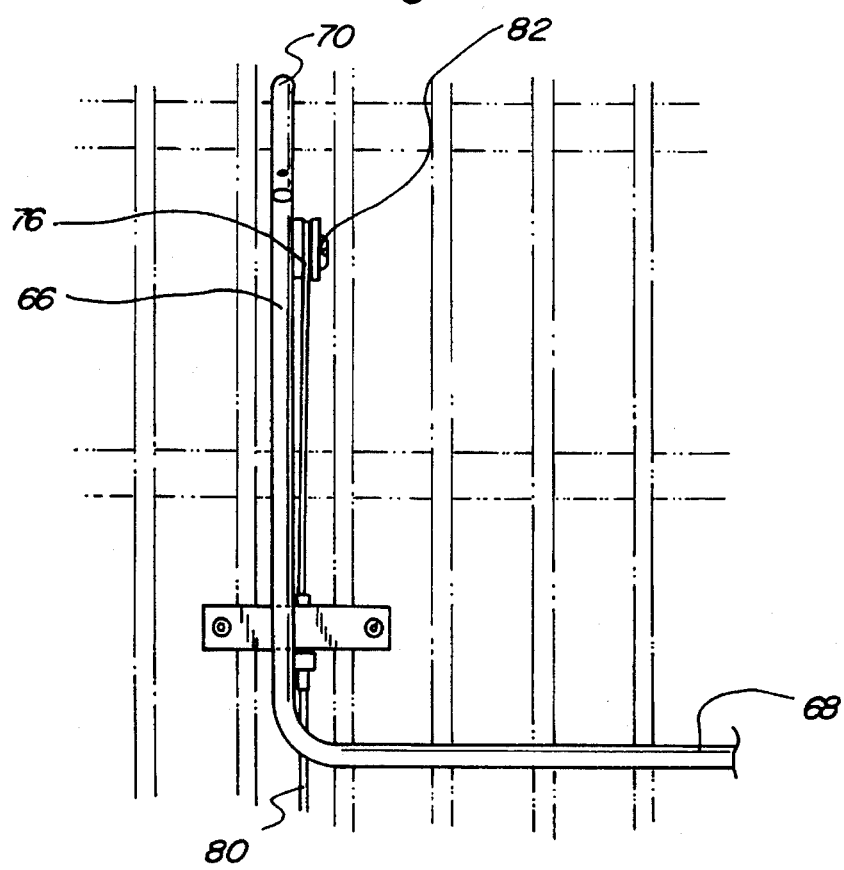
FIG. 8 is an enlarged view of the front release bar of the present invention.
Figure 9:
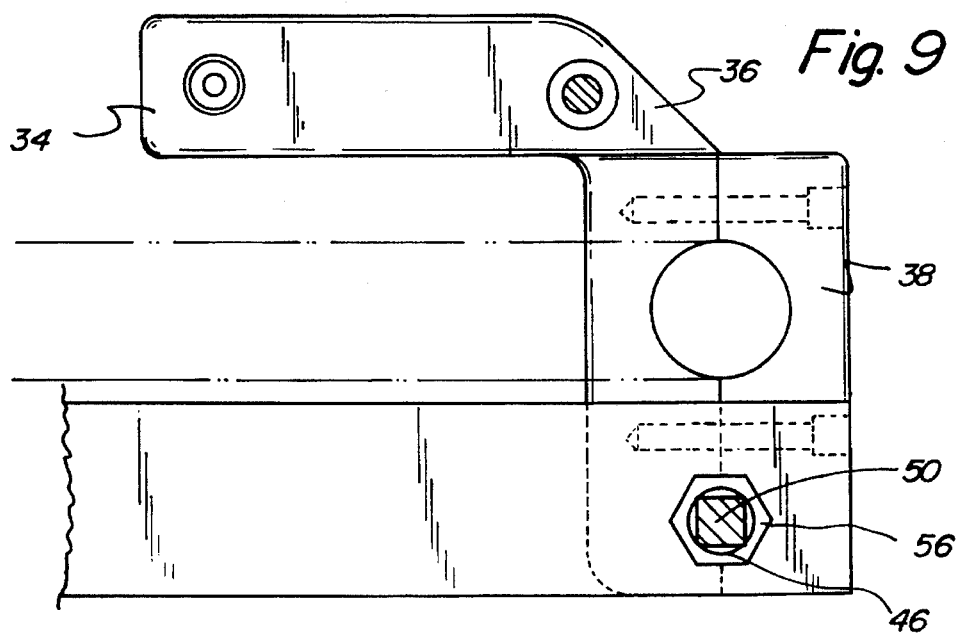
FIG. 9 is a cross-sectional view taken along line 9—9 of FIG. 6.
Figure 10:
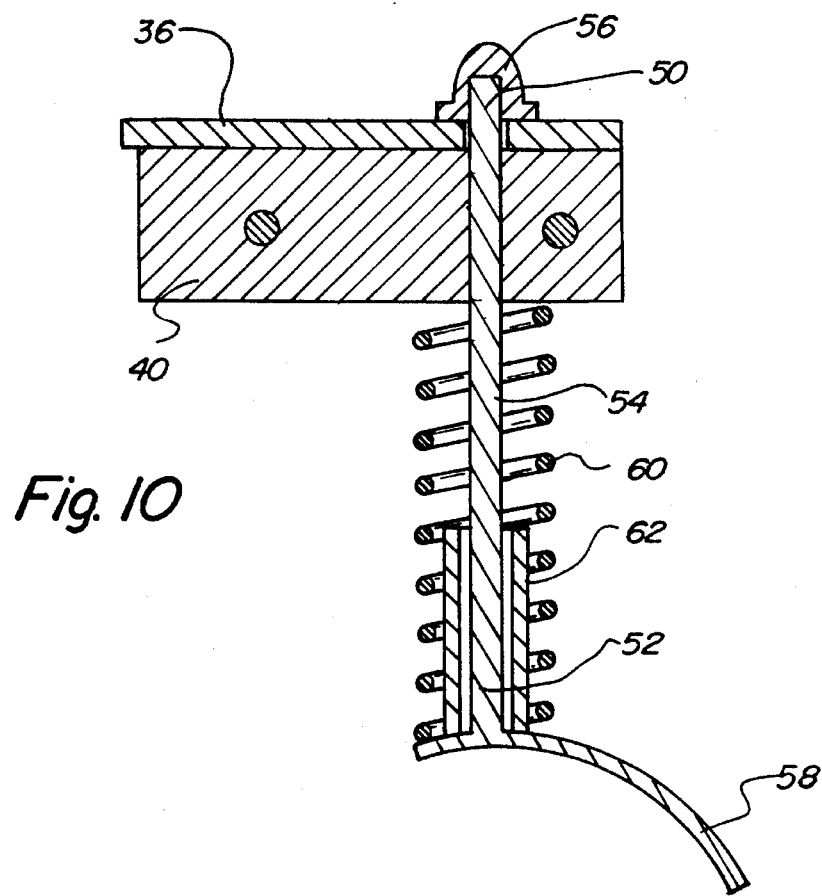
FIG. 10 is a cross-sectional view of the brake taken along line 10—10 of FIG. 6.

With reference now to the drawings, and in particular, to FIG. 1 thereof, the preferred embodiment of the new and improved shopping cart automatic dual brake embodying the principles and concepts of the present invention and generally designated by the reference number 10 will be described.

Specifically, it will be noted in the various Figures that the device relates to a new and improved shopping cart automatic dual brake for automatically applying brakes to wheels of the shopping cart. In its broadest context, the device consists of an inverted U-shaped frame, a pair of swivels, a pair of brake components, a front brake release bar, a front brake cable, and a front brake component.

The device 10 contains an inverted U-shaped frame 12 having two arm portions 14 and a handle portion 16. The two arm portions 14 each have a first end 18 and a second end 20. The handle portion 16 has two end portions 22. Each first end 18 of the two arm portions 14 is integral with the two end portions 22 of the handle portion 16. The U-shaped frame 12 is secured to the shopping cart below its handle by a guide block 24.

The device 10 contains a pair of swivels 26 each having an upper end 28 and a lower end 30 pivotally secured theretogether. The upper end 28 is secured to each second end 20 of the two arm portions 14 of the U-shaped frame 12.

The device 10 contains a pair of brake components 32 comprised of a right brake component and a left brake component. The pair of brake components 32 have an upper plate 34 extending from the right brake component along a bottom portion of the shopping cart to the left brake component. Each of the pair of brake components 32 have a first portion 36 of the upper plate 34 and a second portion 38 of the upper plate 34. The first portion 36 is secured to the lower end 30 of each of the pair of swivels 26. A lower plate 40 has a first end 42 and a second end 44. The lower plate 40 aligns with the upper plate 34 with the second end 44 secured to the second portion 38 of the upper plate 34. An aperture 46 is formed through the upper plate 34 and the lower plate 40. A brake shaft 48 is disposed within the aperture 46. The brake shaft 48 has a first end 50, a second end 52, and an intermediate extent 54 therebetween. The first end 50 extends outwardly of the upper plate 34. An acorn nut 56 is secured to the first end 50. A brake shoe 58 is secured to the second end 52 of the brake shaft 48. The brake shoe 58 is positioned above the rear wheels of the shopping cart. A spring 60 with a spring guide 62 is secured to the intermediate extent 54 of the brake shaft 48. The spring 60 serves to force the brake shoe 58 onto the wheel. The brake shoe 58 needs to be released in order for a user to move the shopping cart. The brake shoe 58 will always be driven down onto the shopping carts wheels unless the user lifts up on the handle portion 16 of the U-shaped frame 12 thus causing the swivel 28 to lift the upper plate 34 which lifts the brake shaft 48 which will lift the brake shoe 58 off of the wheel. When the user releases the handle portion 16, the spring 60 drives the brake shoe 58 back down onto the wheel to keep the shopping cart in place.

The device 10 contains a front brake release bar 64 having two arm bars 66 and a handle bar 68. The two arm bars 66 have curved end portions 70 for hanging on a front end of the shopping cart. A securement pin 72 is situated through the curved end portions 70 to secure the two arm bars 66 to the front end of the shopping cart.

The device 10 contains a front brake cable 74 having a first end 76, a second end 78, and an intermediate extent 80 therebetween. The first end 76 is secured to one of the two arm bars 66 of the front brake release bar 64 by a securement means 82. The intermediate extent 80 extends downwardly of the front end and along an underside of the shopping cart and secured thereto by a plurality of clamps 84.

The device 10 contains a front brake component 86 secured to the second end 78 of the front brake cable 74. The front brake component 86 has a front release bar 88. The front release bar 88 has a first end 90 and a second end 92. The first end 90 is secured to the upper plate 34 adjacent the right brake component. The second end 92 has a wire 94 thereattached for securement to the front brake component 86. The front brake component 86 is triggered when the user lifts the handle bar 68 of the front brake release bar 64 which causes the front brake cable 74 to lift the front brake component 86 which lifts the front release bar 88 which causes the upper plate 34 to rise which lifts the brake shaft 48 which will lift the brake shoe 58 off of the wheel. When the user releases the front brake release bar, the spring 60 drives the brake shoe 58 back down onto the wheel to keep the shopping cart in place. This method allows a user to pull the cart from the front instead of having to push the cart from the rear.

The device 10 contains a pair of foot bars 96 secured to the upper plate 34 inward of the right brake component and the left brake component.

Shopping carts are an absolute necessity for millions of people who do their shopping on a regular basis. Gathering hundreds of dollars worth of groceries would be often impossible without this often disregarded device. But all shopping carts do have inherent shortcomings- they can be blown into parked vehicles by a strong wind, or drawn into them by gravity by a sloping parking lot. There simply is no way to secure them in one location without constant attention. Clearly, what is needed is a method for fixing the wheels to the ground like a parking brake- one that is easy to set and release. That is why the present invention has been conceived. The present invention is a parking device that applies pressure to the wheels from two braking pads. The pads are engaged automatically whenever a special handle beneath the conventional handlebar is released.

The present invention consists of an inverted U-shaped frame that is able to move up or down within two guide blocks, and two braking pads. It is made from tubular chrome plated steel that is bent to match the profile of the existing cart. The bottom of each end of the frame is equipped with two pressure pads. They are automatically forced into the surface of the rear wheels due to the pressure exerted from springs on each side. The guide blocks are installed on the vertical section of the cart that supports the handle. This allows the brake to be disengaged by simply grasping the handle and squeezing the two parts together. When the carts are to be gathered from the lot, the insertion of one cart into another from behind also disengages the brake from all but the first one, allowing ten carts or more to be pushed without resistance.

To set the brakes, the handle is simply released. This forces the pads onto the surface of the wheels. To release the brakes, the handle is gripped which forces the brakes to retract upward.

The present invention can be applied to almost any shopping cart in any retail environment. It is easy t o use, and does not alter the function of the cart in any way. It simply allows the cart to be rendered immobile in a parking lot. With this advantage, the present invention makes a practical addition to any cart.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved shopping cart automatic dual brake for automatically applying brakes to rear wheels of the shopping cart comprising, in combination:

an inverted U-shaped frame having two arm portions and a handle portion, the two arm portions each having a first end and a second end, the handle portion having two end portions, each first end of the two arm portions integral with the two end portions of the handle portion, the U-shaped frame secured to the shopping cart below a handle thereof by a guide block;

a pair of swivels having an upper end and a lower end pivotally secured theretogether, the upper end secured to each second end of the two arm portions of the U-shaped frame;

a pair of brake components comprised of a right brake component and a left brake component, the pair of brake components having an upper plate extending from the right brake component along a bottom portion of the shopping cart to the left brake component, each of the pair of brake components having a first portion of the upper plate and a second portion of the upper plate, the first portion secured to the lower end of each of the pair of swivels, a lower plate having a first end and a second end, the lower plate aligning with the upper plate with the second end of the lower plate secured to the second portion of the upper plate, an aperture formed through the upper plate and the lower plate, a brake shaft disposed within the aperture, the brake shaft having a first end, a second end, and an intermediate extent therebetween, the first end of the brake shaft extending outwardly of the upper plate, an acorn nut secured to the first end of the brake shaft, a brake shoe secured to the second end of the brake shaft, the brake shoe positioned above the rear wheels of the shopping cart, a spring with a spring guide secured to the intermediate extent of the brake shaft, the spring serving to force the brake shoe onto the wheel;

a front brake release bar having two arm bars and a handle bar, the two arm bars having curved end portions for hanging on a front end of the shopping cart, a securement pin situated through the curved end portions to secure the two arm bars to the front end;

a front brake cable having a first end, a second end, and an intermediate extent therebetween, the first end of the front brake cable secured to one of the two arm bars of the front brake release handle bar by a securement means, the intermediate extent of the front brake cable extending downwardly of the front end and along an underside of the shopping cart and secured thereto by a plurality of clamps;

a front brake component secured to the second end of the front brake cable, the front brake component having a front release bar, the front release bar having a first end and a second end, the first end of the release bar secured to the upper plate adjacent the right brake component, the second end of the release bar having a wire thereattached for securement to the front brake component;

a pair of foot bars secured to the upper plate inward of the right brake component and the left brake component.

2. A shopping cart automatic dual brake for automatically applying brakes to wheels of the shopping cart comprising, in combination:

an inverted U-shaped frame secured to the shopping cart below its handle by a guide block;

a pair of swivels secured to the U-shaped frame;

a pair of brake components, the pair of brake components having an upper plate, the upper plate secured to the pair of swivels, a lower plate aligning with the upper plate, an aperture formed through the upper plate and the lower plate, a brake shaft disposed within the aperture and extending outwardly of the upper plate, an acorn nut secured to one end of the brake shaft, a brake shoe secured to another end of the brake shaft, the brake shaft positioned above the wheels of the shopping cart, a spring with a spring guide secured around the brake shaft, the spring serving to force the brake shoe onto the wheel; and a front brake release bar having two arm bars and a handle bar, the two arm bars having curved end portions for hanging on a front end of the shopping cart, a securement pin situated through the curved end portions to secure the two arm bars to the front end.

3. The device as described in claim 2 and further including wherein a front brake cable having a first end, a second end, and an intermediate extent therebetween, the first end secured to one of the two arm bars of the front brake release handle bar by a securement means, the intermediate extent extending downwardly of the front end and along an underside of the shopping cart and secured thereto by a plurality of clamps.

4. The device as described in claim 3 and further including wherein a front brake component secured to the second end of the front brake cable, the front brake component having a front release bar, the front release bar having a first end and a second end, the first end of the front release bar secured to the upper plate adjacent the right brake component, the second end of the front release bar having a wire thereattached for securement to the second end of the front brake component.

* * * * *